US007302255B1

(12) United States Patent
Lundy et al.

(10) Patent No.: US 7,302,255 B1
(45) Date of Patent: Nov. 27, 2007

(54) TELEPHONE NUMBER ALLOCATION AND MANAGEMENT IN A WIRELESS ACCESS POINT

(75) Inventors: Michael T. Lundy, Overland Park, KS (US); Dan Durig, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 307 days.

(21) Appl. No.: 11/192,508

(22) Filed: Jul. 29, 2005

(51) Int. Cl.
*H04Q 7/22* (2006.01)

(52) U.S. Cl. ............... 455/414.1; 455/561; 455/410; 455/411; 455/41.2; 455/550.1; 455/551; 455/461; 370/338

(58) Field of Classification Search ........... 455/461, 455/561, 432.1, 414.1, 435.1, 435.2, 41.2, 455/552.1, 550.1, 560, 410, 411, 551, 405, 455/406, 407, 409, 462, 463, 465, 415, 416, 455/417; 370/338
See application file for complete search history.

(56) References Cited

U.S. PATENT DOCUMENTS 5,999,805 A * 12/1999 Ruther et al. ............... 455/410
6,381,470 B1 * 4/2002 Griffith et al. .............. 455/551
6,904,299 B1 * 6/2005 Biedermann ................ 455/561
7,013,132 B2 * 3/2006 Kehr ........................... 455/415
2004/0236851 A1 * 11/2004 Kuan et al. .................. 709/224
2005/0147073 A1 * 7/2005 Hietalahti et al. .......... 370/338
2005/0266826 A1 * 12/2005 Vlad ........................... 455/410

FOREIGN PATENT DOCUMENTS

JP        2003198756        7/2003

* cited by examiner

*Primary Examiner*—Rafael Perez-Gutierrez
*Assistant Examiner*—Olumide Ajibade-Akonai

(57) ABSTRACT

A method for a WLAN access point to allocate telephone numbers for use by mobile stations. The access point includes stored data indicating one or more allowed telephone numbers. When a mobile station associated with the access point and acquires an IP address, the mobiles station sends a telephone number allocation-request to the access point, seeking allocation of a particular telephone number for use by the mobile station. If the telephone requested number is one of those allowed, then the access point associates the telephone number with the mobile station. On the other hand, if the requested telephone number is not one of those allowed, then the access point provides the mobile station with a list of the available telephone numbers, to allow a user to select a desired telephone number, and the mobile station may then send a new telephone number allocation-request, seeking allocation of the selected telephone number.

17 Claims, 6 Drawing Sheets

TELEPHONE NUMBER ALLOCATION AND MANAGEMENT IN A WIRELESS ACCESS POINT

FIELD OF THE INVENTION

The present invention relates to wireless communications and, more particularly, to management of telephone communications via WLAN access points.

BACKGROUND

It is known today for a wireless mobile station, such as a cell phone, to be able to gain telephone connectivity via a WLAN (e.g., 802.11) access point. To provide such connectivity, the access point can be connected with a packet-switched network, and a media gateway system can then be provided as an interface between the packet-switched network and a traditional telephone system such as the public switched telephone network (PSTN). The mobile station can then place and receive telephone calls via a communication path comprising (i) an air interface connection with the access point, (ii) the packet-switched network, (iii) the media gateway system, and (iv) the PSTN or other telephony system.

In typical practice, the mobile station will associate with the access point through an open association process or through use of a secure key process such as WEP or EAP for instance. Once associated, the mobile station will then acquire an IP address from the access point, so that the mobile station can engage in packet-data communication via the access point. The mobile station will then register with the media gateway system, via the access point and packet-switched network. And in response, the media gateway system, functioning as the equivalent of a legacy mobile switching center (MSC), will send a registration notification message to the mobile station's home location register (HLR), to establish that the media gateway system is now serving the mobile station. The mobile station may then place and receive PSTN calls via the access point and media gateway system.

By way of example, once the mobile station associates with the access point and acquires an IP address, the mobile station may send to the media gateway system a Session Initiation Protocol (SIP) REGISTER message specifying the mobile station's telephone number in the "From" field or other SIP header. In response, the media gateway system may dip into an authentication server (e.g., a RADIUS server) to authenticate the mobile station and may then send an IS-41 Registration Notification (REGNOT) message via a signaling network to the mobile station's HLR to indicate that the media gateway system is serving the mobile station. Upon receipt of a registration notification return result (regnot_rr) message from the HLR, the media gateway system may then respond with a SIP 200 OK to the mobile station to confirm successful registration.

Thereafter, to place a PSTN call, the mobile station may send to the media gateway system a SIP INVITE specifying the called number, and the media gateway system may responsively engage in legacy ISUP signaling to set up the call via the PSTN to that number. After further signaling, a packet-based call leg may thus be set up between the mobile station and the media gateway system and a circuit-based call leg may be set up between the media gateway system and the called party, and the media gateway may bridge those legs together to allow the call to proceed.

Similarly, when a PSTN call is placed to the mobile station's telephone number, ISUP signaling may pass to the media gateway system (as the mobile station's serving "switch"), and the media gateway system may responsively engage in SIP signaling with the mobile station, to set up the call via the packet-switched network to the mobile station. After further signaling, a circuit-based call leg may be set up between the calling party and the media gateway system and a packet-based call leg may be set up between the media gateway system and the mobile station, and the media gateway system may bridge the legs together to allow the call to proceed.

With this arrangement, a mobile station that is equipped to engage in WLAN communication can conveniently associate with an access point (provided the mobile station can meet any necessary security procedures, such as WEP for instance), and the mobile station can then place and receive calls just as though the mobile station were communicating via a traditional cellular telephone network.

SUMMARY

The present invention is directed to a method and system for managing allocation of telephone numbers in a wireless access point. The invention can be usefully employed in a scenario such as that described above, or in other scenarios.

In accordance with an exemplary embodiment of the invention, a WLAN access point will be provisioned with a set of allowed-number data specifying one or more telephone numbers that can be allocated to mobile stations seeking to gain telephony connectivity via the access point. In practice, during or after association with the access point, a mobile station will send to the access point a telephone number allocation-message, asking the access point to assign one or more particular telephone numbers for use by the telephone. For each requested telephone number, the access point will then consult its allowed-number data and will determine if the requested number is allowed.

If the access point determines that the requested number is allowed, then the access point will allocate the number for use by the mobile station. To maintain control, however, the access point will itself register the number with the telephony system (e.g., with the media gateway system) and will then function as a telephone proxy or agent for the mobile station. (Alternatively, the access point can register some or all of its allowed numbers in advance of receiving a telephone number allocation-request, and, upon granting the telephone number allocation-request, the access point can correlate an already-registered number with the requesting mobile station.)

Thereafter, to place a call from an allocated number to a designated (called) number, the mobile station will signal to the access point, and the access point will initiate the call to the called number and will bridge the mobile station into the call. Similarly, when a call is placed to the allocated number, the call will be set up to the access point (since the access point is the registered user of the number), and the access point will signal to the mobile station and bridge the mobile station into the call.

On the other hand, if the access point determines that no number requested by the mobile station is allowed, then, in accordance with the invention, the access point will preferably prompt the user of the mobile station to select a number from those available. For instance, the access point may send to the mobile station a list of one or more allowed telephone numbers, and the mobile station may responsively present the list for viewing by a user. Upon user selection of one of the allowed numbers, the mobile station may then send a new telephone number allocation-request to the access point, and the access point may then allocate the selected number for use by the mobile station.

In an alternative embodiment, the process of prompting a user to select from the set of one or more allowed telephone numbers may occur initially, before the mobile station first requests use of a specific telephone number. For instance, during or after association with the access point, the mobile station can send to the access point a request for a list of the allowed telephone numbers, and the access point may responsively send to the mobile station a list of one or more allowed telephone numbers. Alternatively, during or after association, the access point can autonomously send to the mobile station a list of allowed telephone numbers. The mobile station may then present the list for viewing by a user. And upon user selection of one of the allowed numbers, the mobile station may send a telephone number allocation-request to the access point, seeking allocation of the selected number.

An exemplary access point can be arranged to limit allocation of a given telephone number to just one mobile station at a time. Thus, if an allowed number is currently allocated to a mobile station, the access point would reject a request to allocate the same number to another mobile station.

Alternatively, an access point can be arranged to permit allocation of a given telephone number to more than one mobile station at a time. In that event, the access point can further apply multi-station call handling logic. For instance, if the access point has assigned a given number is assigned to two mobile stations concurrently, the access point can block outgoing calls by one of the mobile stations if the other mobile station is currently engaged in a call, and the access point can simultaneously ring both mobile stations when faced with an incoming call and connect the call to the first mobile station to answer.

At a minimum, the allowed-number data will specify one or more allowed telephone numbers, that is, telephone numbers that the access point is allowed to allocate. For each allowed telephone number, the allowed-number data may further specify other associated data, such as (i) a plaintext name or other label (e.g., "work", "home line 1", "home line 2", etc.) associated with the number, (ii) a password or other authentication data usable to validate a user or mobile station seeking use of the number, and (iii) a Boolean flag indicating whether the number is currently allocated. The allowed-number data can be stored in a database table format or in any other desired format.

Advantageously, the invention can be used to restrict which telephone numbers can be used to place and receive calls through which access points. For example, an access point in a user's home can be provisioned with allowed-number data specifying only the user's personal telephone numbers, such as the user's home telephone number(s) for instance. That way, when the user associates his or her mobile station with the home access point, the user can conveniently opt to have the access point allocate one or more of the user's home telephone number(s) for use by the user's mobile station. Such calls would optimally be billed to the user's home account.

As another example, an access point in a corporate enterprise can be provisioned with allowed-number data specifying as allowed numbers the various telephone numbers of the enterprise. That way, when an enterprise user associates his or her mobile station with the enterprise access point, the user can opt to have the access point allocate one or more of the work numbers for use by the user's mobile station. And such calls would optimally be billed to the enterprise account.

As still another example, a coffee shop, airport, or other establishment can dynamically allocate access point use for certain telephone numbers, by dynamically provisioning an access point to allow those telephone numbers. For instance, a user at a coffee shop can designate his home or work telephone number, and the coffee shop owner (or an automated system) can dynamically provision the coffee shop access point with allowed-number data specifying the user's designated number, optionally for a fixed time period and for a fee. The establishment can further provision the access point with a user-password (e.g., dynamically generated) associated with the designated number. When the user's mobile station associates with the establishment's access point, the user may then opt to have the access point allocate the user's designated number for use by the user's mobile station.

Further, if the mobile station is a multi-mode device also capable of engaging in traditional cellular telephone communication, the mobile station can place and receive calls via a cellular telephone network as well, such as when it is not associated with an access point for telephone connectivity.

Various aspects and advantages of an exemplary embodiment will become apparent to those of ordinary skill in the art by reading the following detailed description, with reference where appropriate to the accompanying drawings. Further, it should be understood that the foregoing and other description and illustration provided throughout this document are intended to describe embodiments of the invention by way of example only, and without limitation.

DETAILED DESCRIPTION

1. Example Network Architecture

Figure 1:
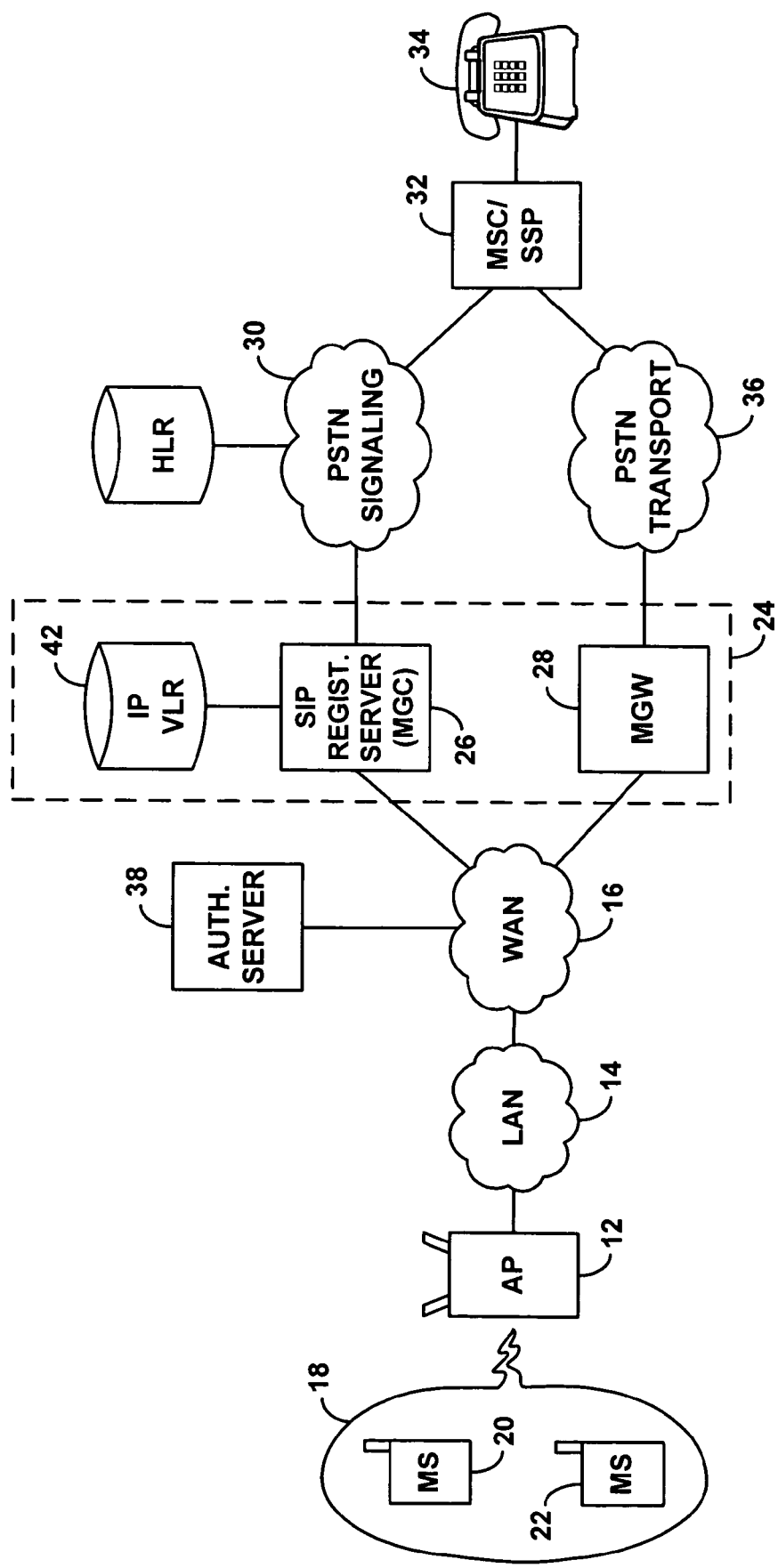
FIG. 1 is a simplified block diagram of a communication network in which an exemplary embodiment of the invention can be implemented.

Referring to the drawings, FIG. 1 is a simplified block diagram depicting a communication network in which an exemplary embodiment of the present invention can be implemented. It should be understood that the elements shown in this figure and elsewhere can vary, and elements can be omitted, added, combined, or distributed in various ways.

As shown in FIG. 1, the network includes an WLAN access point 12 coupled through a local area packet-switched network (LAN) 14 with a wide area packet-switched network (WAN) 16 such as the Internet. In an alternative arrangement, LAN 14 and WAN 16 can be integrated as a single packet-switched network, such as an enterprise LAN for instance.

Access point 12 is preferably a Wi-Fi access point, arranged to operate in accordance with an accepted Wi-Fi communication protocol such as IEEE 802.11, BLUETOOTH or the like. Access point 12 may include a packet-router function and may thus take the form of a WLAN access point router, as is well known in the art. In accordance with the invention, however, access point 12 will be enhanced (such through a firmware upgrade, or at the time of manufacture) to facilitate management of telephone number allocation as described herein.

As further shown, access point 12 radiates to define a Wi-Fi coverage area 18 in which one or more Wi-Fi equipped mobile stations can operate. Two exemplary mobile stations 20, 22 are shown. A suitable mobile station may be a Wi-Fi telephone, such one manufactured by Symbol Technologies, Inc., or Cisco Systems, Inc., for instance. Alternatively or additionally, the mobile station may be a multi-mode device, equipped to engage in both Wi-Fi communication via an access point such as access point 12 and cellular wireless communication via a radio access network provided by a wireless service provider such as Sprint PCS for instance. In accordance with the invention, the mobile station will be enhanced to communicate with access point 12 so as to facilitate management of telephone number allocation.

As next shown, sitting on WAN 16 is a gateway system 24, which provides connectivity with a telephone network 26 such as the PSTN. (Alternatively or additionally, gateway system 24 may provide connectivity with one or more remote IP-telephony endpoints, such as IP-telephones or other gateways (not shown)). In particular, gateway system 24 is shown taking the form of a media gateway system having a media gateway controller (MGC) 26 and a media gateway (MGW) 28.

MGC 26 is coupled with a PSTN signaling network (e.g., an SS7 signaling network) 30 that provides connectivity with one or more remote switches, such as a mobile switching center (MSC) or service switching point (SSP) 32, and each remote switch serves one or more landline or wireless telephone devices, such as a representative telephone 34. Further, MGW 28 is coupled with a PSTN transport network (e.g., one or more voice trunks) 36 that provides connectivity with the remote switch(es) as well.

In practice, MGC 26 is arranged to translate between IP-based call control signaling (such as SIP signaling) and legacy call control signaling (such as ISUP/SS7 signaling), to facilitate call setup between the WAN and the PSTN. Further, MGW 28 is arranged to translate between IP-based bearer traffic (such as Realtime Transport Protocol (RTP) based voice traffic) and legacy bearer traffic (such as PCM-encoded voice traffic), to facilitate bearer communication between the WAN and the PSTN. MGC 26 and MGW 28 may communicate with each other (so that MGC 26 can control MGW 28) over WAN 16 using a protocol such as H.248 or MGCP for instance.

As further shown in the figure, MGC 26 is preferably programmed to function as a SIP registration server, so as to facilitate registration of telephone numbers at particular network addresses, as described in the background section above for instance. (Alternatively, the SIP registration server can be provided separately, preferably in communication with MGC 26.) Further, sitting on WAN 16 or otherwise accessible by MGC 26 (or the SIP registration server function) is an authentication server 38, such as authentication, authorization, and accounting (AAA) server or home subscriber server (HSS), which MGC 26 can query to validate users or devices seeking to register.

PSTN signaling network 30 provides connectivity with a home location register (HLR) 40 that can be used conventionally to maintain a record of which switch is currently serving a given subscriber. Further, MGC 26 preferably includes or has access to an IP-VLR (visitor location register) 42 that MGC 26 may use to store local service profile records for mobile subscribers that it is currently serving. In particular, when MGC 26 registers with HLR 40 on behalf of a given subscriber, HLR 40 may return to MGC 26 the subscriber's service profile, and MGC 26 may store the profile in IP-VLR 42 for later reference.

2. Normal Registration and Call Setup

In normal operation, without the benefit of the present invention, a mobile station such as mobile station 20 will have a pre-assigned telephone number that the mobile station can use to engage in telephone communications via access point 12.

When the mobile station associates with access point 12 and acquires an IP address, the mobile station may then send a SIP REGISTER message via LAN 14 and WAN 16 to MGC 26 (as SIP registration server), seeking to register the presence of its pre-assigned telephone number at its current IP address. In particular, the SIP REGISTER may carry pertinent information about the mobile station such as (i) its assigned telephone number (e.g., specified in or as a SIP NAI), (ii) its current IP address, and (iii) a password or other authentication information. MGC 26 may then dip into authentication server 38 to validate the requesting mobile station/user.

Upon successful validation, MGC 26 may then send an IS-41 REGNOT message to HLR 40, to notify HLR 40 that MGC 26 is serving the designated telephone number. And HLR 40 may return an IS-41 regnot_rr message to MGC 26, providing an applicable service profile for the mobile station, which MGC 26 may store in IP-VLR 42.

Thereafter, the mobile station may place a call from its assigned number by sending a SIP INVITE (via access point 12, LAN 14, and WAN 16) to MGC 26, designating the called telephone number, and including session description information (e.g., in Session Description Protocol (SDP) headers) indicating a desire to set up an RTP-based call to the designated number.

In response, MGC 26 may initiate ISUP call setup signaling in an effort to set up a legacy call leg between it and the called party, and MGC 26 will engage in further SIP call setup signaling in an effort to set up an IP-based call leg between it and the calling mobile station. In particular, MGC 26 may send an ISUP Initial Address Message (IAM) over PSTN signaling network to the remote switch 32 serving the called number to request call setup. In response, the remote switch 32 may ring the called telephone and send an ISUP Address Complete (ACM) message to MGC 26 to indicate that a voice trunk has been reserved for the call. In response to the ACM message, MGC 26 may accordingly send a SIP TRYING message to the mobile station 20, to let the mobile station know that call setup is occurring.

When the called party answers, remote switch 32 may send an ISUP Answer Message (ANM) to the MGC 26 to complete set up of the legacy call leg between the MGC 26 and the called party. And in response to the ISUP ANM, MGC 26 may then send a SIP "200 OK" message to the mobile station 20 to accept the call setup request. Mobile station 20 may then complete set up of the IP-based call leg between it and MGW 28 by sending a SIP ACK to the MGC 26. With both call legs thus set up, MGW 28 may then bridge the legs together, so as to allow the call to proceed.

Similarly, when MGC 26 receives an ISUP IAM from remote switch 32, seeking to set up a call to the telephone number registered to mobile station 20, MGC 26 will responsively send a SIP INVITE to the mobile station, seeking to set up an IP-based call leg between the MGW 28 and the mobile station. When a user of the mobile station answers the call, the mobile station may then send a SIP 200 OK to the MGC 26, and the MGC 26 may correspondingly send an ISUP ANM to the remote switch 32, to complete set up of a legacy call leg between the MGW 28 and the remote switch (and calling party). Further, MGC 26 may send a SIP ACK to the mobile station 20, to complete set up of an IP-based call leg between the MGW 28 and the mobile station 20. The MGW may then similarly bridge those two call legs together, to allow the call to proceed.

3. Enhanced Access Point Configuration

Figure 2:
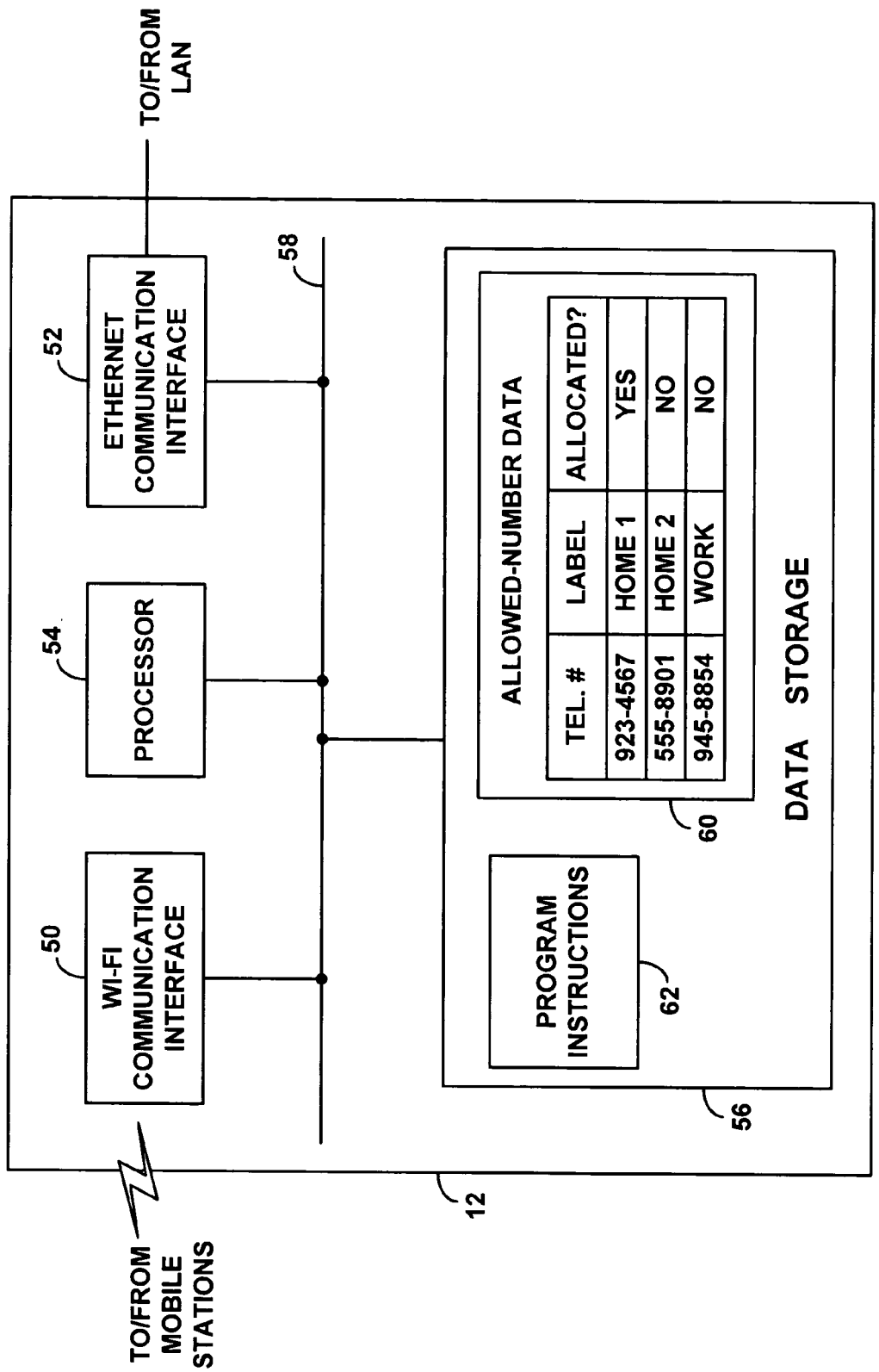
FIG. 2 is a simplified block diagram of a WLAN access point arranged to operate in accordance with the exemplary embodiment.

FIG. 2 is a simplified block diagram showing various functional components that access point 12 may include in accordance with the present disclosure. As shown, access point 12 includes a Wi-Fi communication interface 50, an Ethernet network interface 52, a processor 54, and data storage 56, all of which are coupled together by a system bus or other mechanism 58. Although the components are shown within one unitary box, it should be understood that the components can instead be distributed among various physically separate entities.

Wi-Fi communication interface 50 preferably comprises an 802.11 chipset and antennas adapted to facilitate air interface communication with correspondingly equipped mobile stations in a manner well known in the art (or later developed). Ethernet network interface 52 similarly takes a form well known in the art, for providing Ethernet connectivity to LAN 14. As noted above, the access point can further include router functionality.

Processor 54 preferably comprises one or more general purpose processors (e.g., INTEL microprocessor chips) and/or special purpose processors (e.g., digital signal processors). Data storage 56, in turn, includes one or more volatile and/or non-volatile storage components (e.g., magnetic, optical, or organic) and may be integrated in whole or in part with processor 54.

As shown, data storage 56 contains allowed-number data 60, which, as noted above, may take the form of a table listing a set of allowed telephone numbers and, for each telephone number, information such as (i) a label, (ii) a password, and (iii) an allocation-flag. Each telephone number may comply with the standard North American telephone number formatting, but the telephone numbers can take other forms as well (e.g., as used in other geographic regions).

Access point 12 can be provisioned with the allowed-number data 60 in various ways and at various times. By way of example, the access point may include a web server function through which a user can manually provision the allowed-number data from a web browser. Alternatively, the access point may include program logic that causes the access point to automatically request a set of allowed-number data from a designated network server upon power-on, or in response to various trigger events such as the occurrence of a particular time or date, the receipt of a trigger message transmitted from another entity, or the connection of the access point to an IP network. The provisioning can occur statically at the time the access point is installed or distributed, or later. Alternatively, the provisioning can occur dynamically, such as to allow use of a newly designated telephone number for instance.

Further, data storage 56 contains program instructions 62 (e.g., machine-language instructions) executable by processor 54 to carry out various functions described herein. For example, data storage 56 may contain program instructions executable by the processor (i) to cause access point 12 to broadcast an SSID in coverage area 18, (ii) to receive an association request from a mobile station in the coverage area, to authenticate the mobile stations if necessary, and (iii) to assign a local IP address for use by the mobile station (e.g., as a DHCP function). Further, data storage 56 may contain program instructions that define a web server function through which a user, administrator, or other machine can provision access point 12 with the allowed-number data.

Still further, data storage 56 preferably contains program instructions executable by the processor to receive a telephone number allocation-request from a mobile station and to respond to the telephone number-allocation request in the manner described herein. And yet further, the data storage 56 preferably contains program instructions executable by the processor to engage IP-based call setup signaling communication (e.g., SIP signaling) with both a mobile station and MGC 26, to engage in IP-based bearer communication (e.g., RTP communication) with both a mobile station and MGC 26, and to bridge call legs together.

4. Enhanced Mobile Station Configuration

Figure 3:
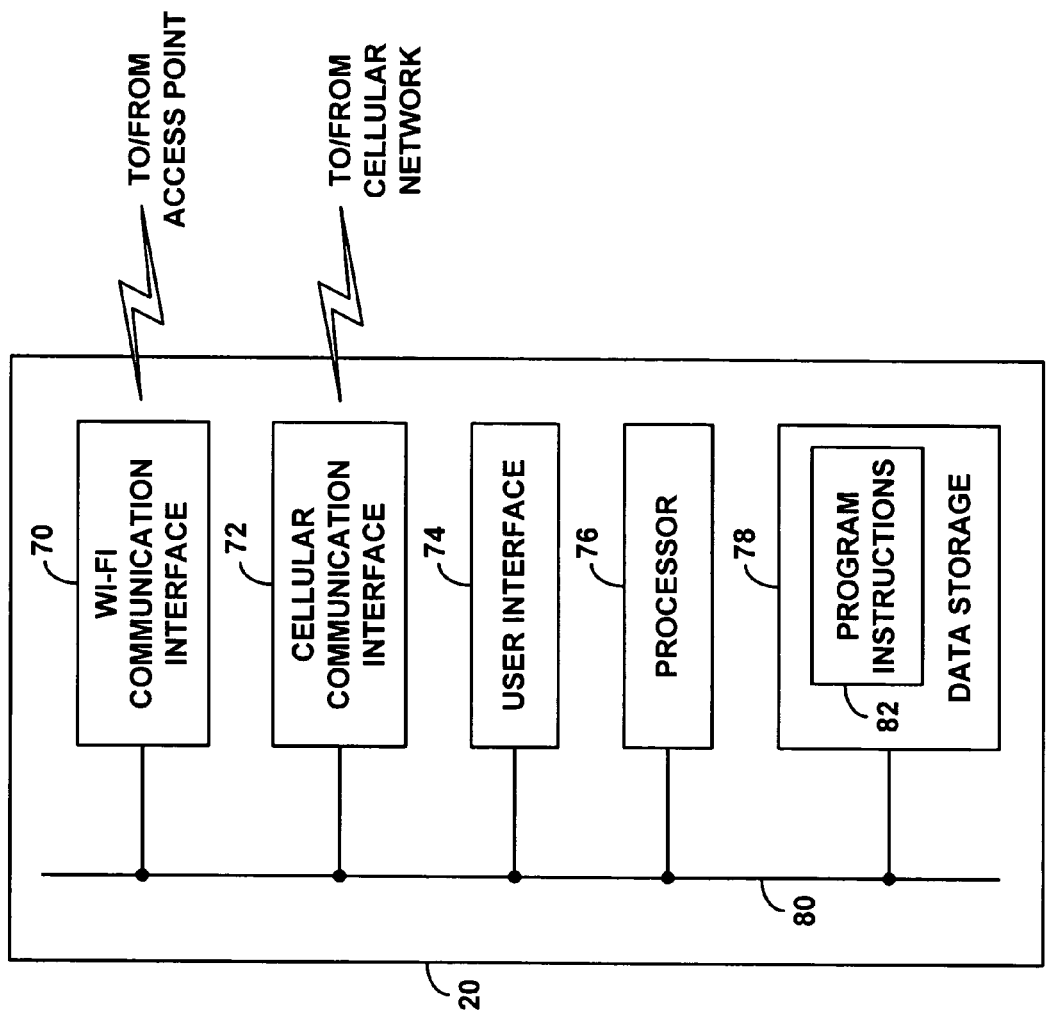
FIG. 3 is a simplified block diagram of a mobile station arranged to operate in accordance with the exemplary embodiment.

FIG. 3 is next a simplified block diagram showing various functional components that a mobile station, such as mobile station 20, may include in accordance with the present disclosure. A preferred mobile station 20 will be a multi-mode device that is capable of engaging in both Wi-Fi based telephony and more traditional cellular telephony. However, as noted above, the mobile station could instead be simply a Wi-Fi based telephone. Further, it should be understood that the mobile station can support any sort of real-time media communication, whether voice-only, video, and/or a combination of these or other sorts of media.

As shown in FIG. 3, mobile station 20 includes a Wi-Fi communication interface 70, a cellular communication interface 72, a user interface 74, a processor 76, and data storage 78, all of which are coupled together by a system bus or other mechanism 80. As with the access point 12, although the components of mobile station 20 are shown within one unitary box, it should be understood that the components can instead be distributed among various physically separate entities.

Wi-Fi communication interface 70 preferably comprises an 802.11 chipset and antennas adapted to facilitate air interface communication with access point 12. Cellular communication interface 72, similarly, may comprise a cellular chipset and antennas adapted to facilitate communication with a cellular radio access network according to a protocol such as CDMA, TDMA, AMPS, or GSM, for instance. Wi-Fi communication interface 70 and cellular communication interface 72 can be integrated in whole or in part, such as comprising an integrated chipset and/or sharing one or more antennas.

User interface 74 preferably comprises user output components such as a display screen and audio speaker, and input components such as a keypad, touch-sensitive screen, and microphone. Further, user interface 74 preferably includes circuitry for converting between analog and digital representations of voice or media, so as to facilitate communication of such media.

Processor 76 preferably comprises one or more general purpose processors and/or special purpose processors. And data storage 78 preferably includes one or more volatile and/or non-volatile storage components (e.g., magnetic, optical, or organic) and may be integrated in whole or in part with processor 54.

As shown, data storage 78 contains program instructions executable by processor 76 to carry out various functions described herein. For instance, data storage 78 preferably includes program instructions for detecting an SSID broadcast from access point 12 and for responsively associating with access point 12 and acquiring an IP address. Data storage 78 further includes program instructions executable by processor 76 to cause user interface 74 to prompt a user to enter or select a desired telephone number to be allocated for use by mobile station 20. Such prompting can occur in response to a user request (e.g., menu selection) and/or in response to access point 12 sending to mobile station 20 a set of one or more allowed telephone numbers.

Further, data storage 78 includes program instructions executable by processor 76 to generate and send to access point 12 a telephone number allocation-request and to receive and handle a response from access point 12 as described herein. Still further, data storage 78 includes program instructions executable by processor 76 to engage in IP-based call setup signaling communication (e.g., SIP signaling) and IP-based bearer communication (e.g., RTP communication) with access point 12.

5. Example Process Flow

Figure 4:
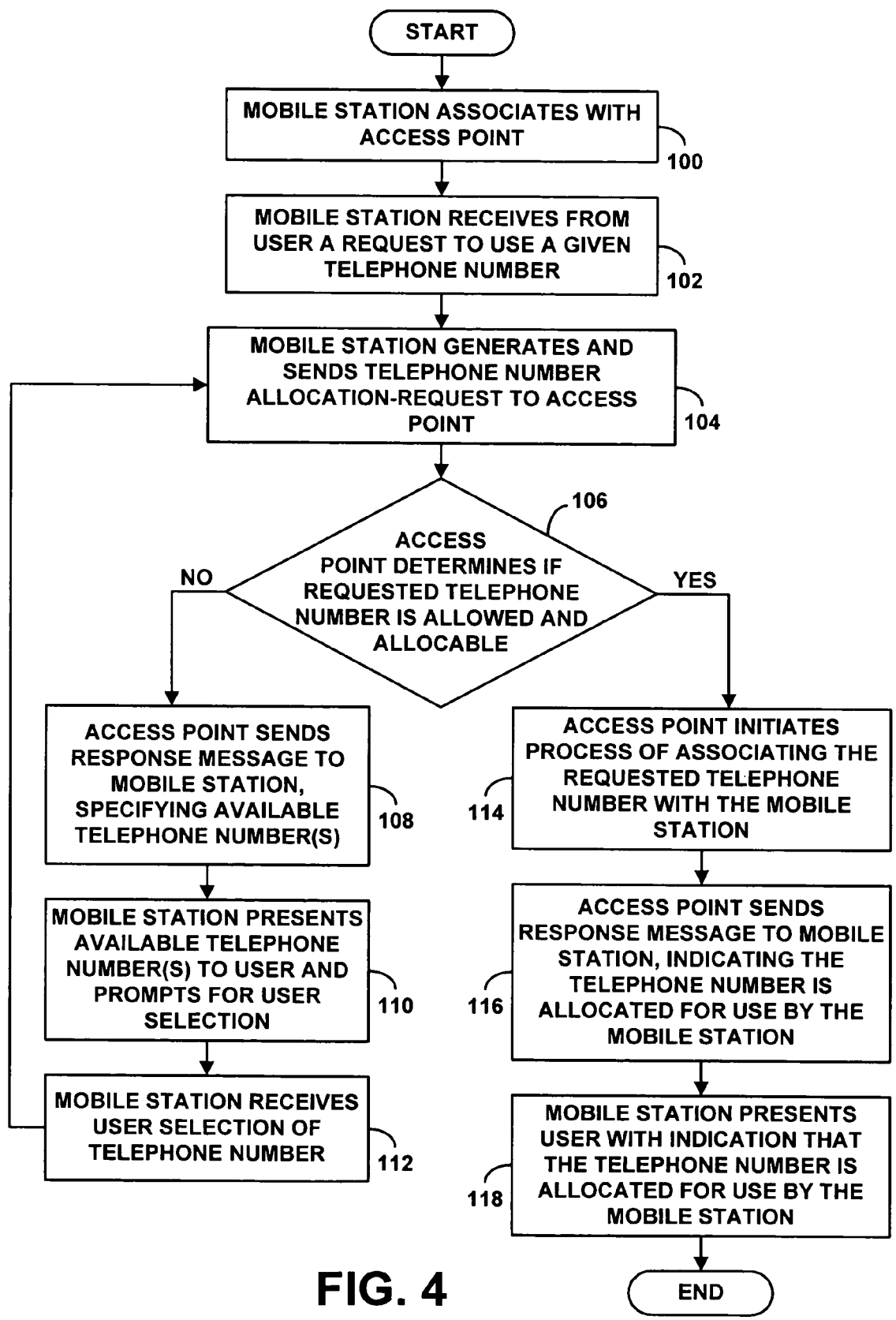
FIG. 4 is a flow chart depicting functions that can be carried out in accordance with the exemplary embodiment.

FIG. 4 is a flow chart depicting functions that can be carried out in accordance with an exemplary embodiment of the invention. It should be understood that the order of functions shown in this figure and elsewhere can vary, and functions can be omitted, added, combined, or distributed in various ways.

As shown in FIG. 4, at block 100, mobile station 20 associates with access point 12 and acquires an IP address. This function can involve access point 12 broadcasting an SSID, mobile station 12 detecting the SSID, and mobile station responsively sending an association request to access point. The association request can carry authentication data as described above, and access point 12 can use the authentication data to validate the mobile station before granting the request. Upon successful association, the mobile station may send a DHCP request, and access point 12 may responsively assign an IP address for use by the mobile station.

At block 102, mobile station 20 next receives from a user of mobile station 20 a request to use a particular telephone number. In the exemplary embodiment, for instance, the user may select a "Wi-Fi Telephone Number Allocation" menu item presented on user interface 74 of mobile station 20, and mobile station may responsively present the user with a screen image into which the user can enter a desired number to use. The user can enter the number as a telephone number or as the label that access point 12 would associate with the telephone number. Alternatively, mobile station 20 may have stored one or more telephone numbers or labels, such as frequently used numbers or their associated labels, and mobile station 20 may present the one or more numbers or labels to the user and allow the user to select a desired number or label from the number(s) or label(s) presented. The mobile station may also request and receive from the user a password or other authentication information to be provided when requesting use of a particular telephone number.

At block 104, mobile station 20 generates and wirelessly transmits to access point 12 a telephone number allocation request designating the user-specified (or user-selected) telephone number. In a preferred embodiment, the telephone number allocation request can take the form of a SIP SUBSCRIBE message, in which the requested telephone number (or label) is set forth in a predefined SIP header field, such as an OPTIONS field. Further, the mobile station 20 may include in the request any password or other authentication information provided by the user or otherwise known by the mobile station (e.g., pre-stored in the mobile station). The mobile station sends the telephone number allocation-request over IP to the access point, from the mobile station's assigned IP address.

In an alternative arrangement, the user can specify or select more than one telephone number, in which case the mobile station 20 can include a list of the multiple requested telephone numbers in its telephone number allocation-request, or the mobile station 20 can send separate telephone number allocation-requests. If multiple telephone numbers are requested, access point 12 can treat the request as a request to allocate as many of the numbers as possible (possibly allocating more than one number to the mobile station), or access point 12 can treat the request as a request to allocate the first allowed number on the list, i.e., in priority order listed.

At block 106, access point 12 compares the telephone number (i.e., telephone number or label) designated in the telephone number allocation-request (or each number, if multiple) with the telephone number(s) specified by the allowed-number data 60, to determine whether the requested number is allowed. Further, to the extent the access point 12 is arranged to limit allocation of a given number to just one mobile station at a time (such as if the allowed-number data indicates such as restriction), the access point 12 may further determine from the allowed-number data whether the telephone number is already allocated.

At block 108, if the requested telephone number does not match any specified by the allowed-number data, or the requested telephone number matches but is not allocable (e.g., is already allocated), then the access point 12 sends to mobile station a negative response message that specifies the allowed (and allocable) number(s), if any. The response message may, for instance, take the form of a SIP 200 OK message, specifying the available telephone numbers in one or more predefined SIP header fields. Alternatively, the response may take the form of a SIP 400 series message newly defined just for this purpose, similarly specifying the available telephone numbers.

In response to the negative response message, at block 110, the mobile station will present to the user the specified available telephone number(s) and will prompt the user to select one or more of the presented telephone numbers. At block 112, the mobile station will then receive a user selection of one or more of the presented telephone numbers. The process then returns to block 104, where the mobile station again generates and sends to access point 12 a telephone number allocation-request.

If no numbers are currently allowed and allocable, the access point 12 may instead send to the mobile station a negative response message that indicates no telephone numbers are currently available for use. In response, the mobile station may then present a message to the user suggesting that the user try again later.

On the other hand, if the access point 12 determines that the requested telephone number matches one listed in the allowed-number data and is allocable (and if any necessary authentication data validates the request), then, at block 114, the access point 12 will initiate a process of associating the requested telephone number with the mobile station 20.

In the preferred embodiment, to associate the requested telephone number with the mobile station, the access point 12 itself will send a SIP REGISTER message to MGC 26, designating the telephone number and indicating that the telephone number is in use at the IP address of the MGC 26 (thus treating the access point 12 as the subscriber/user of the telephone number). As a result, MGC 26 may then send an IS-41 REGNOT via PSTN signaling network 30 to HLR 40 and may receive a corresponding profile record in response. Further, MGC 26 may send a SIP 200 OK to access point 12, confirming the registration. The access point 12 may then store an indication that the telephone number is allocated to the mobile station (such as by listing the mobile station's IP address or other mobile station identifier in the number-allocation data).

Alternatively, as noted above, the access point can pre-register one or more of its allowed numbers, before receiving a telephone number allocation-request. For instance, in response to being provisioned with allowed-number data or in response to being connected to LAN 14, the access point 12 can automatically send a SIP REGISTER request, respectively, for each of the numbers listed in its allowed-number data, in order to register each such number at the access point 12. (To the extent any calls are placed to such numbers before the numbers are allocated, the calls would go unanswered or could be treated in some other designated manner.) To associate the requested telephone number with the mobile station, the access point may then simply store an indication that the pre-registered telephone number is allocated to the mobile station.

At block 116, upon associating the requested telephone number with the mobile station, the access point will then generate and send a positive response message to the mobile station, as an indication that the requested number is now allocated for use by the mobile station 20. The positive response message can be a SIP 200 OK message, which can indicate the allocated telephone number in a predefined SIP header field. In a situation where the mobile station had requested more than one telephone number, the positive response message can specify which of the telephone numbers are allocated for use by the mobile station. At block 118, the mobile station may then present the user with an indication that the requested telephone number has been allocated for use by the mobile station.

In an alternative embodiment, note that mobile station 20 can send to access point 12 a telephone number allocation-request that does not designate any particular telephone number but that instead seeks allocation of any available telephone number. For instance, the mobile station can leave blank the field of the telephone number allocation-request that would normally specify the requested telephone number. Alternatively, the mobile station can provide in that field a predefined codeword that the access point 12 will understand to signify a general telephone number allocation request.

Access point 12 can treat such a request as one generally seeking allocation of a telephone number for use by the mobile station, and the access point 12 can respond to the request in the same manner as the access point would respond to a request seeking allocation of a telephone number that is not allowed or not allocable. Namely, the access point 12 may send a response message to the mobile station, specifying the available telephone numbers, to allow user selection of one or more numbers to be allocated. The process may then continue as described above.

Alternatively, access point 12 may respond to such a general telephone number allocation-request by randomly (or otherwise) selecting one of the allowed and allocable telephone numbers and allocating the number for use by the mobile station. In one embodiment, the access point may inform the mobile station what telephone number has been allocated. In another embodiment, the access point may allocate the telephone number without revealing to the mobile station what the number is, thus providing an anonymous telephone number allocation. In either case, a general telephone number request and allocation process can be used to facilitate a pay-as-you-go telephone service, such as by having the access point or another entity collect user payment for each call made.

In yet another alternative embodiment, a telephone number allocation-request can be assumed, without actually being sent by the mobile station. By way of example, once a mobile station has associated with the access point and acquired an IP address, the access point may automatically allocate a telephone number for use by the mobile station and may send a message (e.g., a SIP NOTIFY message) to the mobile station to inform the mobile station of the allocated number The access point may select the telephone number based on the identifier of the mobile station, as provided in association signaling, or in some other manner.

Further, in another alternative embodiment, the telephone number allocation process can occur during association of the mobile station with the access point, rather than after association of the mobile station with the access point. For example, the mobile station may provide a telephone number allocation-request to the access point by including allocation-request parameters among the other parameters that the mobile station would normally include in its association request to the access point. New message fields can be defined for this purpose, with corresponding programming of the mobile station and access point, if necessary.

Still further, note that the allocation of a telephone number to a mobile station can be restricted in various ways. For example, the allocation can be restricted by time such that the allocation would expire after a designated period of time. As another example, the allocation can be restricted by number of calls, such that the allocation would expire after a certain number of incoming and/or outgoing calls placed to/from the allocated number.

Figure 5:
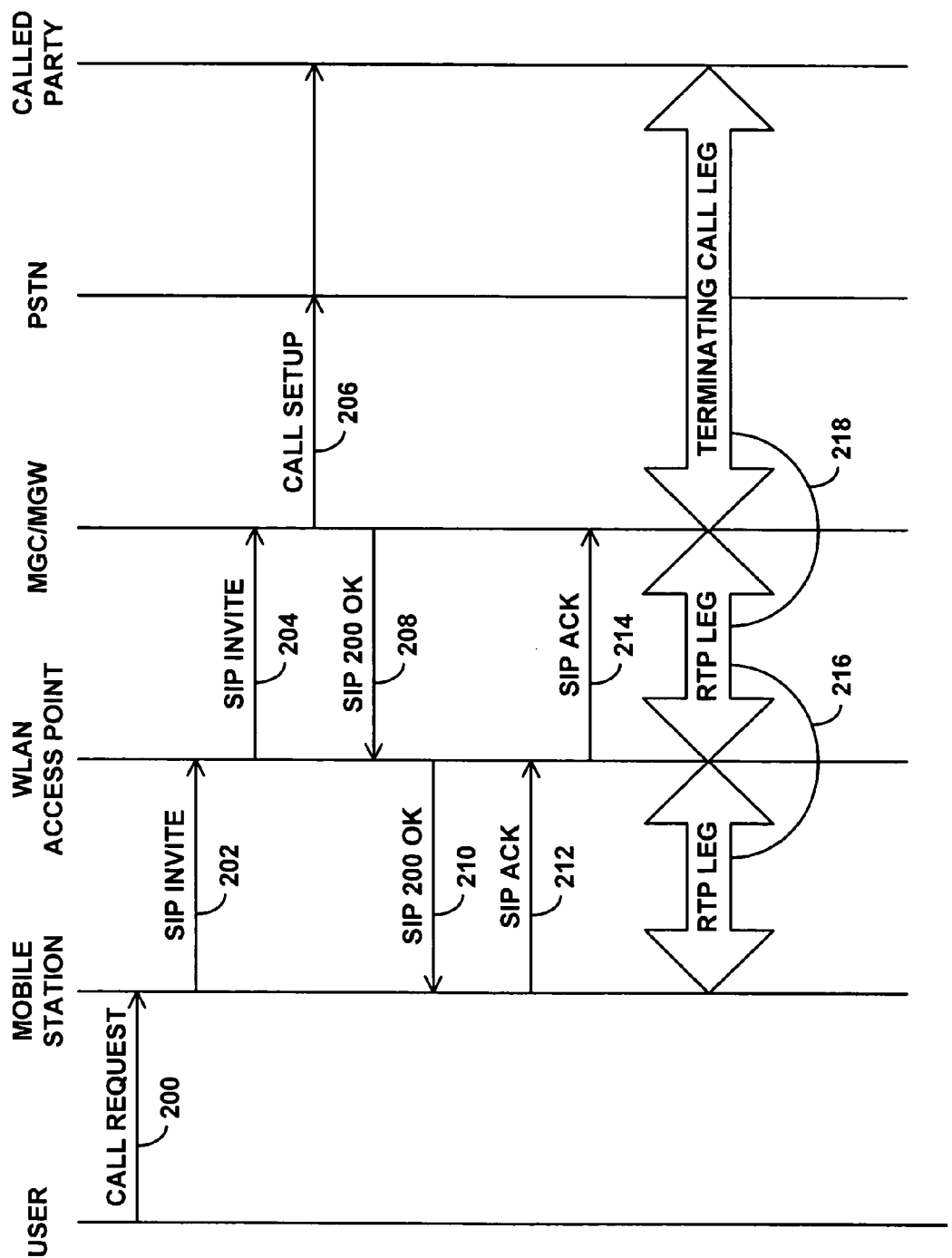
FIG. 5 is a message flow diagram depicting messaging involved in outgoing call setup in accordance with the exemplary embodiment.

FIG. 5 is next a message flow diagram depicting messaging involved in setting up an outgoing call from the mobile station 20, after the access point 12 has allocated a telephone number for use by the mobile station.

As shown in FIG. 5, at step 200, the mobile station receives a user request to place a call to a designated telephone number ("called number"). In response, at step 202, the mobile station generates and sends a SIP INVITE to the access point 12, seeking to set up a call to the called number, and specifying (e.g., in SDP fields) that the call is to be a voice call, for instance. At step 204, the access point then responsively itself sends a SIP INVITE to MGC 26, seeking to set up the call from the access point. At step 206, the MGC 26 then seeks to set up the call, such as via the PSTN for instance, to the called party, and, at step 208, the MGC 26 sends a SIP 200 OK to the access point. In response, at step 210, the access point sends a SIP 200 OK to the mobile station.

At step 212, the mobile station then sends a SIP ACK to the access point, completing set up of an IP-based call leg between the mobile station and the access point. And at step 214, the access point then sends a SIP ACK to the MGC 26, completing set up of an IP-based call leg to the MGW 28 (with MGW 28 presumably then connecting a terminating call leg to the called party). At step 216, the access point then bridges the two IP-based call legs together, so as to allow the call to proceed between the mobile station and the MGW 28 (and, at step 218, the MGW 28 bridges the call leg to the called party).

Figure 6:
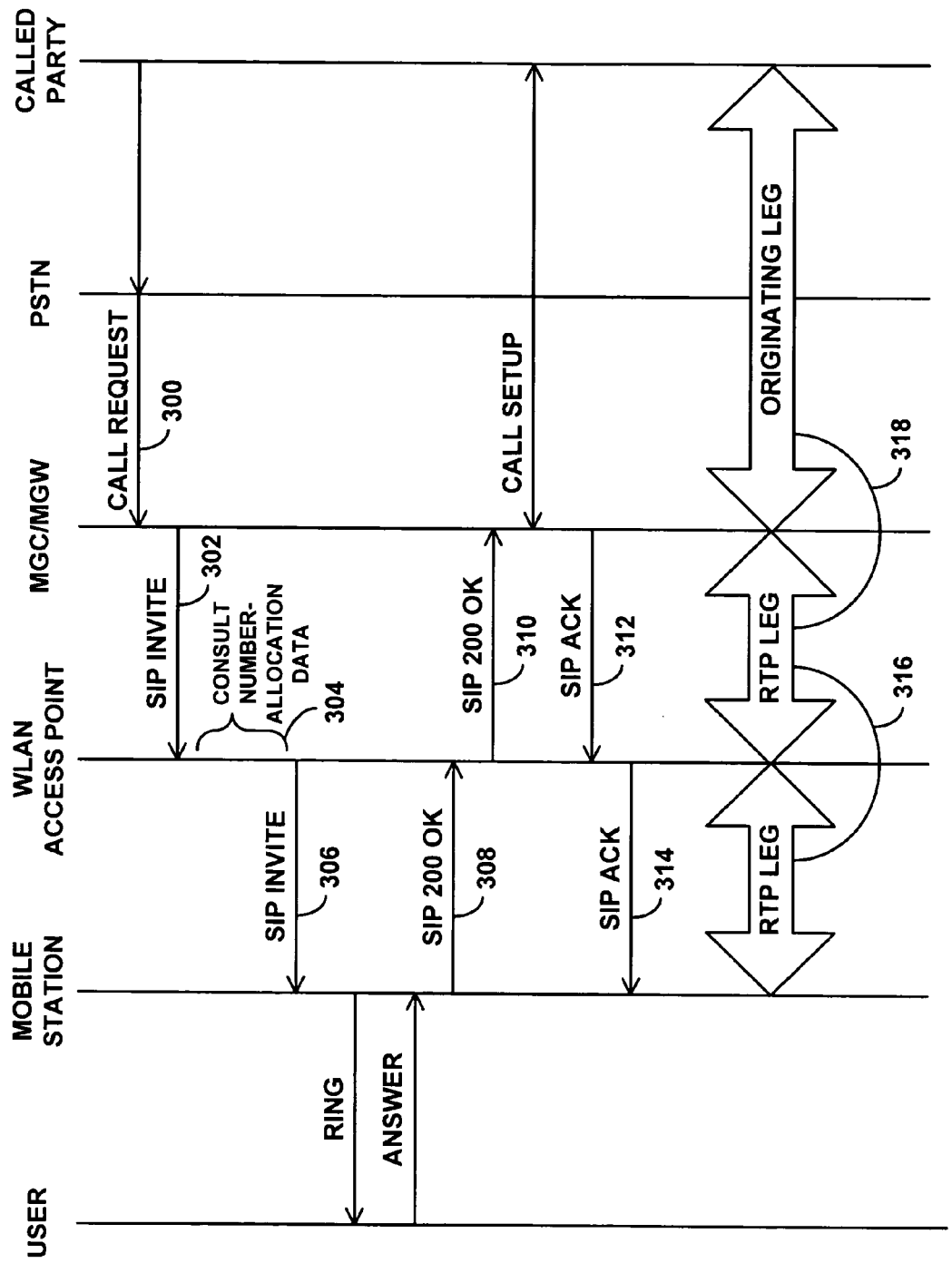
FIG. 6 is a message flow diagram depicting messaging involved in incoming call setup in accordance with the exemplary embodiment.

Finally, FIG. 6 is a message flow diagram depicting messaging involved in setting up an incoming call to a telephone number that access point 20 has allocated for use by mobile station 20.

As shown in FIG. 6, at step 300, when a call is placed to the allocated telephone number, MGC 26 receives a call setup message (e.g., an ISUP IAM), because MGC 26 is serving that number. At step 302, MGC 26 then sends a SIP INVITE to access point 12, since the telephone number is registered at the IP address of the access point. In response to the SIP INVITE, at step 304, the access point consults its number-allocation data or otherwise determines that the called number is allocated to mobile station 20. Thus, at step 306, the access point sends a SIP INVITE itself to mobile station 20, which causes mobile station 20 to ring.

At step 308, when a user of mobile station 20 answers the call, mobile station 20 sends a SIP 200 OK to the access point. And at step 310, the access point then responsively sends a SIP 2000K to the MGC 26. After further signaling with the originating entity (e.g., remote switch 32), at step 312, MGC 26 sends a SIP ACK to access point, thus completing setup of an IP-based call leg between access point 12 and MGW 28 (with MGW 28 presumably then connecting an originating call leg from the calling party). And in response, at step 314, access point 12 sends a SIP ACK to mobile station 20, thus completing set up of an IP-based call leg between access point 12 and mobile station 20. At step 316, the access point then bridges the two IP-based call legs together, so as to allow the call to proceed between the mobile station and the MGC 26 (and, at step 318, the MGW 28 bridges the call leg from the called party).

6. Conclusion

An exemplary embodiment of the present invention has been described above. Those skilled in the art will understand, however, that changes and modifications may be made to this embodiment without departing from the true scope and spirit of the present invention, which is defined by the claims.

For example, although the foregoing description focuses on allocating telephone numbers to mobile stations, the invention can be extended to have an access point allocate telephone numbers to other IP-based telephony devices, including landline IP-telephones, fax machines, media terminal adapters, multimedia computers, and other devices. For instance, after a landline IP-telephone acquires a local IP address from a WLAN access point router, the telephone and access point router can apply the process as described above to have the access point router allocate a telephone number for use by the IP telephone. Other examples are possible as well.

We claim:

1. In a wireless local area network (WLAN) access point, a method comprising:
   maintaining in data storage a set of allowed-number data that specifies one or more telephone numbers allocable by the access point to telephone devices served by the access point;
   receiving a telephone number allocation-request from a client station served by the access point, the telephone number allocation-request specifying at least one requested telephone number for use by the mobile station to engage in telephony service via the access point;
   in response to the telephone number allocation request, making a determination of whether the requested telephone number is an allocable telephone number specified by the allowed-number data; and
   if the determination is that the requested telephone number is an allocable telephone number specified by the allowed-number data, then allocating the requested telephone number for use by the client station to engage in telephony service via the access point.

2. The method of claim 1, wherein the allowed-number data associates a label with the requested telephone number, and wherein the telephone number allocation-request specifies the requested telephone number by specifying the label.

3. The method of claim 1, wherein the allowed-number data associates authentication data with the requested telephone number, and wherein the telephone number allocation-request specifies the authentication data to facilitate validation of the request.

4. The method of claim 3, further comprising:
   conditioning allocation of the requested telephone number on successful validation of the request.

5. The method of claim 1, wherein the telephone number allocation-request specifies multiple requested telephone numbers, and wherein making a determination of whether the requested telephone number is an allocable telephone number specified by the allowed-number data comprises making a determination of whether any of the multiple requested telephone numbers is an allocable telephone number specified by the allowed-number data.

6. The method of claim 1, wherein the client station is a mobile station, and wherein receiving the telephone number allocation-request comprises receiving the telephone number allocation-request wirelessly from the mobile station.

7. The method of claim 6, wherein receiving the telephone number allocation-request wirelessly from the mobile station comprises receiving the telephone number allocation-request wirelessly from the mobile station after the mobile station has associated with the access point and acquired an IP address assigned by the access point.

8. The method of claim 7, wherein the telephone number allocation-request comprises a Session Initiation Protocol (SIP) message.

9. The method of claim 1, further comprising registering the requested telephone number with a telephony system for use of the telephone number by the access point,
   wherein allocating the requested telephone number for use by the client station comprises recording in data storage an association of the requested telephone number with the client station.

10. The method of claim 9, wherein registering the requested telephone number comprises pre-registering the requested telephone before receiving the telephone number allocation-request.

11. The method of claim 9, further comprising:

if the determination is that the requested telephone number is an allocable telephone number specified by the allowed-number data, then, after allocating the requested telephone number for use by the client station, setting up a call by a process selected from the group consisting of:

(a) receiving an IP-based outgoing call request seeking connection of an outgoing call from the client station, and responsively (i) engaging in IP-based call setup signaling with the client station to set up a first IP-based outgoing call leg between the access point and the client station, (ii) engaging in IP-based call setup signaling with a telephony system to set up a second IP-based outgoing call leg between the access point and the telephony system, and (iii) bridging the first and second IP-based outgoing call legs together to allow the outgoing call to proceed; and (b) receiving an IP-based incoming call request from a telephony system seeking connection of an incoming call to the requested telephone number, and responsively (i) determining that the requested telephone number is allocated to the client station, (ii) engaging in IP-based call setup signaling with the telephony system to set up a first IP-based incoming call leg between the access point and the telephony system, (iii) engaging in IP-based call setup signaling with the client station to set up a second IP-based incoming call leg between the access point and the client station, and (iv) bridging the first and second IP-based incoming call legs together so as to allow the incoming call to proceed.

12. The method of claim 1, further comprising:

if the determination is that the requested telephone number is not an allocable telephone number specified by the allowed-number data, then sending a response message to the client station, the response message designating a set of one or more available telephone numbers to facilitate user selection of a telephone number.

13. The method of claim 12, thereafter receiving from the client station a new telephone number allocation-request specifying as a new requested telephone number a telephone number selected by a user from the set of one or more available telephone numbers designated by the response message.

14. The method of claim 1, further comprising allocating the requested telephone number for concurrent use by the client station and by another client station.

15. The method of claim 1, further comprising restricting allocation of the requested telephone number according to a parameter selected from the group consisting of time and number of calls.

16. In a mobile station, a method comprising:

detecting a service set identifier (SSID) broadcast from a WLAN access point, and responsively associating with the access point and acquiring an IP address;

thereafter sending to the access point a telephone number allocation-request requesting the access point to allocate a specified telephone number for use by the mobile station to engage in telephony service via the access point; and if the specified telephone number is one that the access point determines to be allowed and allocable, then receiving from the access point a response message indicating successful allocation of the telephone number for use by the mobile station to engage in telephony service via the access point.

17. The method of claim 16, further comprising:

if the specified telephone number is one that the access point determines to not be an allowed allocable telephone number, then (i) receiving from the access point a response message specifying one or more available telephone numbers, (ii) prompting a user to select from the one or more telephone numbers, (iii) receiving a user selection of a telephone number from the one or more available telephone numbers, and (iv) sending a new telephone number allocation-request to the access point, the new telephone number allocation-request requesting allocation of the selected telephone number for use by the mobile station to engage in telephony service via the access point.

* * * * *